(12) United States Patent
Kato et al.

(10) Patent No.: US 7,267,317 B2
(45) Date of Patent: Sep. 11, 2007

(54) SLIDE DEVICE

(75) Inventors: Hisayoshi Kato, Toyoake (JP);
Kazuyuki Taniguchi, Anjo (JP);
Masamitsu Iwatani, Kariya (JP);
Yoshiyuki Miura, Kariya (JP)

(73) Assignee: Toyota Shatai Kabushiki Kaisha, Kariya (JP)

( * ) Notice: Subject to any disclaimer, the term of this patent is extended or adjusted under 35 U.S.C. 154(b) by 277 days.

(21) Appl. No.: 10/488,209

(22) PCT Filed: Sep. 13, 2002

(86) PCT No.: PCT/JP02/09417

§ 371 (c)(1),
(2), (4) Date: Sep. 20, 2004

(87) PCT Pub. No.: WO03/024738

PCT Pub. Date: Mar. 27, 2003

(65) Prior Publication Data

US 2005/0017551 A1    Jan. 27, 2005

(30) Foreign Application Priority Data

Sep. 14, 2001  (JP)  .............................. 2001-278945
Nov. 5, 2001   (JP)  .............................. 2001-338889

(51) Int. Cl.
*F16M 13/00*  (2006.01)
(52) U.S. Cl. .................................. 248/429; 312/334.11
(58) Field of Classification Search ................ 248/420, 248/424, 429, 430; 384/18; 312/334.11; 297/65
See application file for complete search history.

(56) References Cited

U.S. PATENT DOCUMENTS

| | | | | |
|---|---|---|---|---|
| 2,606,090 A | * | 8/1952 | Straubel .................. | 312/334.11 |
| 3,449,033 A | * | 6/1969 | Pipe ....................... | 312/334.11 |
| 4,194,793 A | * | 3/1980 | Offermans ................. | 384/18 |
| 4,483,504 A | * | 11/1984 | Duwelshoft ................ | 248/429 |
| 4,662,761 A | * | 5/1987 | Hoffman ................... | 384/18 |
| 4,725,032 A | * | 2/1988 | Kazaoka et al. ............ | 248/430 |
| 4,842,318 A | * | 6/1989 | Fussnegger et al. .......... | 296/64 |
| 4,921,359 A | * | 5/1990 | Sakamoto .................. | 384/18 |
| 5,219,230 A | * | 6/1993 | Babbs ..................... | 384/47 |
| 5,301,914 A | * | 4/1994 | Yoshida et al. ............ | 248/430 |
| 5,472,272 A | * | 12/1995 | Hoffman ................... | 312/334.11 |
| 5,797,575 A | * | 8/1998 | Clausen ................... | 248/429 |
| 5,895,101 A | * | 4/1999 | Cabrales et al. ........... | 312/334.11 |
| 6,105,920 A | * | 8/2000 | Gauger .................... | 248/429 |

FOREIGN PATENT DOCUMENTS

| | | | |
|---|---|---|---|
| EP | 0697306 A1 | * | 2/1996 |
| JP | 357084236 A | * | 5/1982 |
| JP | A 57-84236 | | 5/1982 |
| JP | 57-103237 | | 6/1982 |
| JP | A 57-90225 | | 6/1982 |
| JP | 61-12838 | | 1/1986 |

* cited by examiner

Primary Examiner—Anita M. King
(74) Attorney, Agent, or Firm—Oliff & Berridge, PLC

(57) ABSTRACT

A slide device, comprising first class members having spaces opening to sides formed in the longitudinal directions thereof and second class rail members positioned in the spaces, wherein either of the first and second class rail members movable relative to each other are formed in movable rail members and the other are formed in fixed rail members, the movable rail members are installed at both side parts of slide plates, the slide plates are positioned on brackets parallel with each other, and the movable rail member installed on the slide plate is supported by the fixed rail member installed on the slide plate.

10 Claims, 6 Drawing Sheets

SLIDE DEVICE

TECHNICAL FIELD

The present invention relates to a slide device and more particularly to improvement of the construction of the slide device preferable for use in a slide seat to which a high offset load is applied and which is used by a physically handicapped person in getting on and off a vehicle.

BACKGROUND ART

FIG. 8 shows the outlook of a van-type vehicle having a slide seat which is used by the physically handicapped person when the physically handicapped person gets on and off the vehicle. A slide door SD at a side surface of the vehicle is opened so that a seat ST for the vehicle is advanced to a lower position, near a road surface, outside the vehicle by a slide device SE. As shown in FIG. 9, the slide device SE is constructed of a pair of parallel outer rails 101 disposed outermost, a pair of parallel middle rails 102 disposed inward from the outer rails 101, and a pair of parallel inner rails 103 disposed inward from the middle rails 102. The left and right middle rails 102 and the left and right inner rails 103 are integrated with each other with cross members 104, 105 installed at front and rear positions of the slide device SE.

The seat ST (FIG. 8) is placed on the inner rails 103 through a seat bracket (not shown). The outer rail 101 is placed on a rotary disk installed in an inclined posture on a slide mechanism (not shown) disposed in the longitudinal direction of the vehicle by means of a bracket 106. When the physically handicapped person gets on and off the vehicle, the entire slide device SE is directed orthogonally to the longitudinal direction of the vehicle by means of the rotary disk, and the middle rail 102 and the inner rail 103 are slid in an advance direction by means of a ball thread driving mechanism, as shown in FIG. 10 to locate the seat ST placed on the inner rail 103 near the road surface. Because the slide device SE can be advanced in a two-stage system, except when the physically handicapped person gets on and off the vehicle, the slide device SE is accommodated compactly inside the space-limited vehicle by moving the rails 102, 103 rearward.

As the construction for sliding the middle rail 102 relative to the outer rail 101 and the inner rail 103 relative to the middle rail 102, as shown in FIG. 11, a guide groove 107 triangular in section extending in the longitudinal direction of the rails is formed on a confronting surface of the rails 101 through 103, and a plurality of balls 85 held by ball guides (not shown) respectively is disposed at predetermined intervals in the space between the guide grooves 107. The slide device is disclosed in Japanese Patent Application Laid-Open No. 2001-130293.

However, in the above-described conventional slide device, when the seat is advanced outward from the vehicle, by the weight of a person and the dead weight of each rail, a high offset load is applied in such a way as to vertically shift the rear-end portion of the inner rail 103 and the rear-end portion of the middle rail 102 relative to the front-end portion of the middle rail 102 and the front-end portion of the outer rail 101 respectively. Such being the case, heretofore, to prevent the groove surface of the guide groove 107 from being damaged by the above-described offset load, the guide groove 107 is quenched. But the quenching has a problem that much time and labor are required in a quenching operation and in correcting the groove surface which is deformed by the quenching. Further it is necessary to perform processing of forming holes such as installing holes for installing the cross members 104, 105 and processing of cutting the guide groove 107. In addition, it is necessary to perform a work of installing the cross members while making accurate adjustment of parallelism between the left and right rails 101 through 103.

The present invention is intended to solve the above-described problems. Therefore it is an object of the present invention to provide a slide device which can be manufactured and assembled easily.

DISCLOSURE OF THE INVENTION

To achieve the above-described object, in the first invention, there is provided a slide device comprising a first-type rail member forming a space open sideways and extending in a longitudinal direction of the first-type rail member; a second-type rail member positioned in the space; and a resistance-reducing member interposed between an upper surface of the second-type rail member and an opposed upper-side surface of the first-type rail member and between a lower surface of the second-type rail member and an opposed lower-side surface of the first-type rail member to allow the first-type rail member and the second-type rail member to move relative to each other in the longitudinal direction of the rails. One of the first-type rail member and the second-type rail member movable relative to each other is constructed as a movable-side rail member; the other of the first-type rail member and the second-type rail member is constructed as a fixed-side rail member supporting the movable-side rail member; and the movable-side rail member is provided on both side parts of a slide plate and supported by the fixed-side rail member provided on a base member.

In the first invention, the slide construction of sandwiching the first-type rail member forming the space open sideways and the second-type rail member positioned in the space in such a way that both rail members are movable relative to each other by the resistance-reducing member is applied to the movable-side rail member and the fixed-side rail member supporting the movable-side rail member to support the slide plate slidably relative to the base member. Therefore compared with the construction in which balls serving as the resistance-reducing member are interposed between side surfaces of opposed rail members, the slide device of the first invention displays a sufficient degree of durability against a offset load applied in such a way as to vertically shift the movable-side rail member and the fixed-side rail member from each other. Consequently it is unnecessary to cut or quench guide grooves and save labor for correcting them required in use. Because the slide construction is provided at both side parts of the slide plate, it is possible to assemble the slide device in advance at places other than an assembling line without performing a work of installing cross members while making accurate adjustment of parallelism between left and right rails.

In the second invention according to the first invention, a plurality of the slide plates is positioned on the base member with the slide plates parallel with one another; and the movable-side rail member provided on one of the slide plates is supported by the fixed-side rail member provided on other slide plate adjacent to the one of the slide plates or the base member. Which of the first-type rail member and the second-type rail member is constructed as the movable side or the fixed side may be different for each of a plurality of combinations of the first-type rail member and the second-type rail member in the slide device.

In the third invention according to the first invention or the second invention, the first-type rail member is constructed by molding a plate into an approximately U-shaped configuration in section; and the second-type rail member is constructed of a flat plate inserted into a space of the first-type rail member.

In the third invention, it is possible to simply manufacture each rail member by press molding, similarly to the slide plate. It is also possible to mold a part of the first-type rail member or the second-type rail member in integration with a part of the slide plate.

In the fourth invention according to any one of the first invention through the third invention, the movable-side rail member and the fixed-side rail member disposed in a vertical direction are constructed of the sectionally approximately U-shaped first-type rail member forming a space open in one direction and the sectionally approximately U-shaped first-type rail member forming a space open in the other direction respectively; and one of side walls of the both first-type rail members vertically disposed is formed by molding a common member. In the fourth invention, one of side walls of the both first-type rail members vertically disposed is formed by molding the common member. Thus the manufacturing cost can be reduced.

In the fifth invention according to any one of the first invention through the fourth invention, a plurality of guide grooves extending parallel with one another in a longitudinal direction of the rails is formed on upper-side and lower-side surfaces of the first-type rail member and on at least one of upper and lower surfaces of the second-type rail member; a plurality of balls serving as the resistance-reducing member is rollably disposed along the guide grooves; and a plurality of the guide grooves is spaced from each other in such a way that the balls disposed in the grooves adjacent to each other overlap each other in the longitudinal direction of the rails.

In the fifth invention, a plurality of guide grooves extending parallel with one another in the longitudinal direction of the rails is formed on the upper-side surface and the lower-side surface of the first-type rail member and on at least one of the upper and lower surfaces of the second-type rail member. A plurality of balls is rollably disposed along the guide grooves. Therefore even if the number of the balls of each guide groove is equal to that of the balls provided by the conventional art, it is possible to much increase the number of balls. Thereby when a high load of vertically shifting the fixed-side rail and the movable-side rail relative to each other is applied, the load is dispersed to a large number of the balls and hence the surface pressure of each of the balls is much lower than that applied to the surface pressure of the ball in the conventional slide device. Therefore even if the guide groove is not quenched, it is possible to securely prevent the guide groove from being plastically deformed. Further a plurality of the guide grooves is spaced from each other in such a way that the balls disposed in the grooves adjacent to each other overlap each other in the longitudinal direction of the rails. Therefore it is possible to minimize the guide groove formation range in the direction vertical to the longitudinal direction of the rail, namely, in the widthwise direction of the guide groove. Even though the width of the rail is set small, it is possible to dispose a sufficient number of balls.

In the sixth invention, upper and lower slide plates are arranged in an approximately horizontal posture in a vertical direction and parallel with each other; a first rail section forming a space which has an upper-side portion and a lower-side portion and is open toward one of left and right directions of the side plates is provided at left and right side parts of the lower side plate; a second rail section forming a space which has an upper-side portion and a lower-side portion and is open toward the other of the left and right directions of the side plates is provided over the first rail section; a third rail section slidably fitting on the second rail section is provided at both side parts of the upper side plate; and a fourth rail section slidably fitting on the first rail section is provided on the base member.

In the sixth invention, the fourth rail section provided on the base member is slidably fitted on the first rail section forming the space open toward one of left and right directions of the side plate. Further the third rail section provided at both side parts of the upper side plate is slidably fitted on the second rail section forming the space open toward the other of the left and right directions of the side plate. Therefore compared with the construction in which balls are interposed between side surfaces of opposed rail members, the slide device displays a sufficient degree of durability against an offset load applied of vertically shifting the movable-side rail member and the fixed-side rail member from each other is applied. Consequently it is unnecessary to cut or quench the guide grooves and save labor for correcting them required in use. Thus it is easy to manufacture the slide device. Because the slide construction is provided at both side parts of the slide plate, it is possible to assemble the slide device in advance at places other than an assembling line without performing a work of installing cross members while making accurate adjustment of parallelism between left and right rails. Thus assembling can be accomplished easily.

In the seventh invention, a plurality of slide plates is vertically arranged on a base member in an approximately horizontal posture and parallel with each other; a first rail section forming a space which has an upper-side portion and a lower-side portion and is open toward one of left and right directions of the side plates is provided at left and right side parts of the side plates except an uppermost slide plate; a second rail section forming a space which has an upper-side portion and a lower-side portion and is open toward the other of the left and right directions of the side plates is provided over the first rail section; a lower-side part of the first rail section of one of the slide plates is slidably fitted on the second rail section of the other side plate downwardly adjacent to the one of the slide plates; an upper-side part of the second rail section of one of the slide plates is slidably fitted on the first rail section of other side plate upwardly adjacent to the one of the slide plates; a third rail section slidably fitting on the second rail section of one of the slide plates downwardly adjacent to other side plate disposed uppermost is provided on both left and right side parts of the side plate disposed uppermost; and a fourth rail section slidably fitting on the first rail section of the side plate disposed uppermost is provided on the base member. The seventh invention provides the slide device of a multi-stage type by providing the slide device with three or more slide plates. The slide device of the seventh invention has operation and effect similar to that of the sixth invention.

In the eighth invention according to the sixth invention or the seventh invention, a lower-side part of the second rail section is constructed of an upper-side part of the first rail part of each of the slide plates.

In the ninth invention according to any one of the sixth invention through the eighth invention, a guide groove extending in a slide direction of the slide plate is formed on at least one of vertically opposed surfaces of the rails; and a plurality of balls which rollably contact the opposed surfaces is disposed on the guide groove. In the ninth invention, it is possible to reduce an operation force at the time of slide.

In the tenth invention according to the ninth invention, the guide grooves of the rails are located at positions vertically overlapping each other.

In the eleventh invention according to the ninth invention or the tenth invention, a plurality of the guide groove is formed on one surface; and a plurality of the guide grooves is spaced from each other in such a way that the balls disposed in the grooves adjacent to each other overlap each other in the slide direction of the slide plate.

In the twelfth invention, in a slide device in which a movable-side rail member is slidably movably supported on a fixed-side rail member through balls, a plurality of guide grooves extending parallel with one another in a longitudinal direction of the rails is formed on at least one of opposed surfaces of the fixed-side rail member and the movable-side rail member; a plurality of balls is rollably disposed along the guide grooves; and a plurality of the guide grooves is spaced from each other in such a way that the balls disposed in the grooves adjacent to each other overlap each other in the longitudinal direction of the rails.

In the twelfth invention, a plurality of guide grooves extending parallel with one another in the longitudinal direction of the rails is formed on the opposed surfaces of the fixed-side rail and the movable-side rail. A plurality of balls is rollably disposed along the guide grooves. Therefore even if the number of the balls of each guide groove is equal to that of the balls provided by the conventional art, it is possible to much increase the number of balls. Therefore when a high load of vertically shifting the fixed-side rail and the movable-side rail relative to each other is applied, the load is dispersed to a large number of the balls and hence the surface pressure of each of the balls is much lower than that applied to the surface pressure of the ball in the conventional slide device. Therefore it is unnecessary to quench the guide groove. Thus it is possible to reduce time and labor required to manufacture the slide device. Further a plurality of the guide grooves is spaced from each other in such a way that the balls disposed in the grooves adjacent to each other overlap each other in the longitudinal direction of the rails. Therefore it is possible to minimize the guide groove formation range in the direction vertical to the longitudinal direction of the rail, namely, in the widthwise direction of the guide groove. Thus even though the width of the opposed surfaces of the rails is set small, it is possible to dispose a sufficient number of balls.

In the thirteenth invention, the fixed-side rail member is constructed of a pair of rail members; a space which extends in a longitudinal direction of the both rail members and is open sideways is formed between the rails; a plate-shaped movable-side rail member is disposed in the space; the guide grooves are formed on both surfaces of the movable-side rail member and surfaces of the both rail members opposed to the both surfaces of the movable-side rail member; and the movable-side rail member is slidably movably sandwiched between the both rail members through the balls disposed in the guide grooves.

In the thirteenth invention, the movable-side rail member is sandwiched between the rail members of the fixed-side rail member through the balls. Therefore compared with the conventional construction in which balls are interposed between side surfaces of opposed rail members, the slide device displays a sufficient degree of durability against an offset load of vertically shifting the movable-side rail member and the fixed-side rail member from each other is applied.

In the fourteenth invention according to the twelfth invention or the thirteenth invention, a ball guide, made of a resin, having a plurality of ball-holding openings rotatably holding the balls formed at certain intervals; and an inner circumferential surface of each of the ball-holding openings is so formed that an inner diameter of each of the ball-holding openings is a little larger than an outer diameter of each of the balls and decreases toward an aperture of each of the ball-holding openings to make a diameter of the aperture smaller than the outer diameter of each of the balls.

In the fourteenth invention, a ball is inserted into the ball-holding opening by elastically expanding the aperture of the ball-holding opening. As a result, the aperture returns to the original shape and prevent the ball from escaping from the ball holding opening. In this state, the ball is rotatably held in the ball holding opening with a portion of the ball exposed from the apertures.

BEST MODE FOR CARRYING OUT THE INVENTION

FIRST EMBODIMENT

Figure 1:
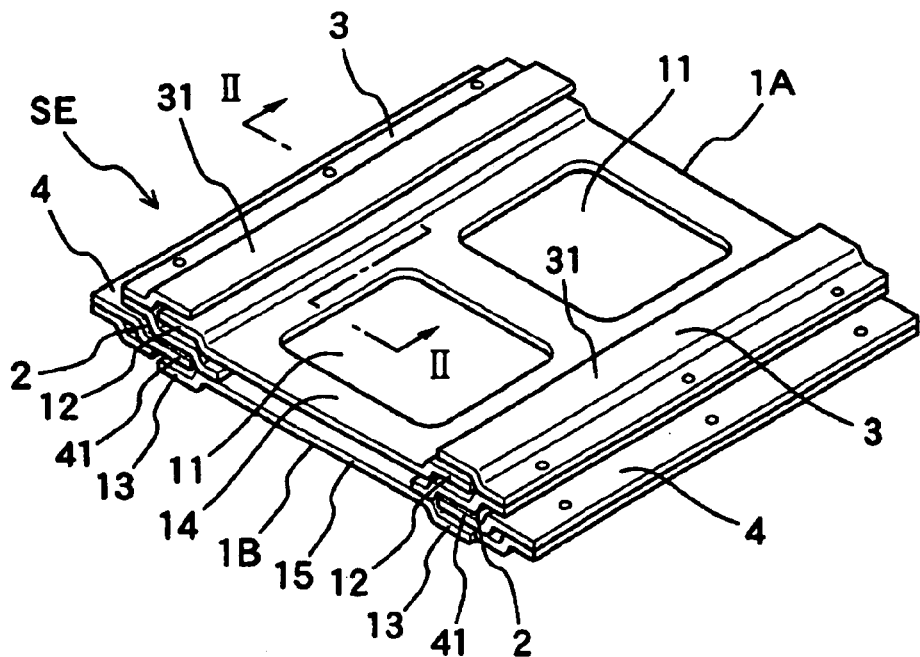
FIG. 1 is a perspective view showing an entire slide device in an accommodated state, showing an embodiment of the present invention.
Figure 2:
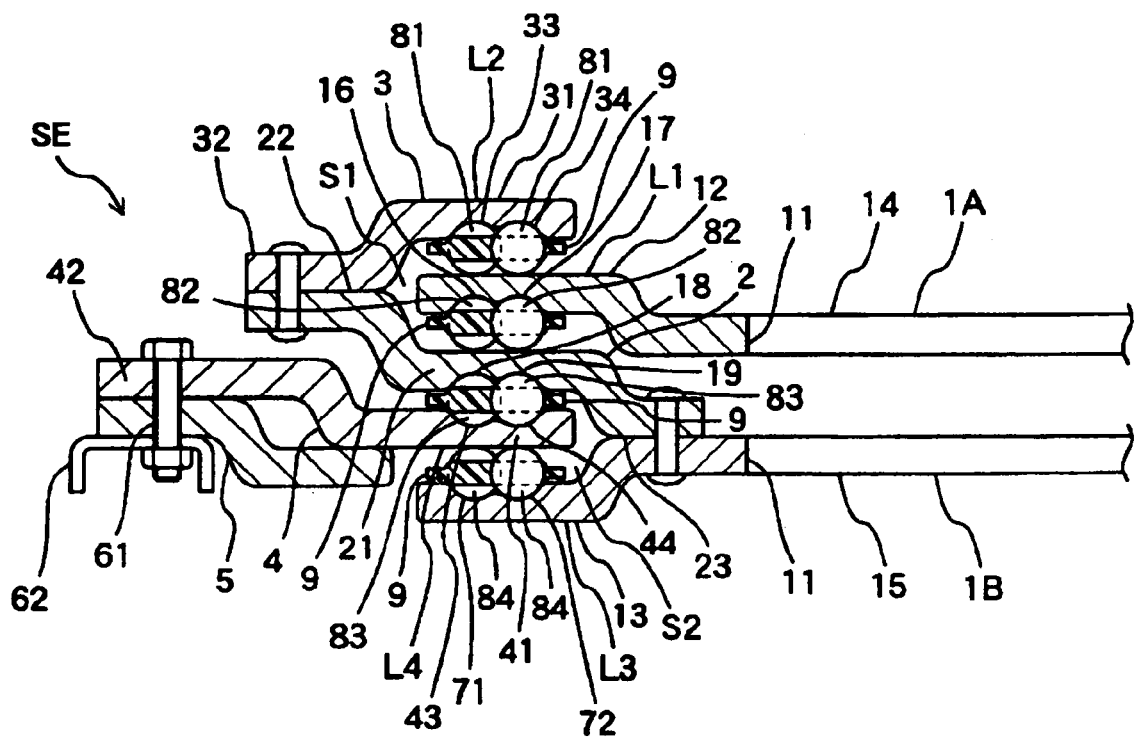
FIG. 2 is a sectional view taken along a line II-II of FIG. 1.

FIG. 1 shows the outlook of a slide device SE. The slide device SE has two rectangular slide plates 1A, 1B disposed vertically and parallel with each other. A rectangular hole 11 for making the slide device SE lightweight is formed at front and rear positions of a central part of each of the slide plates 1A, 1B. Both side parts 12, 13 (only one side part is shown in FIG. 2) of the lower slide plate 1B and the upper slide plate 1A curve upward or downward from general parts 14, 15 respectively and extend horizontally in a constant width. The slide plates 1A, 1B are formed in the same configuration by press molding and symmetrically disposed at upper and lower positions by inverting one slide plate. The side part 12 of the slide plate 1A serves as a rail member L1 which is a second-type rail member and a movable-side rail member. The side part 13 of the slide plate 1B constitutes a part of a rail member L3 which is described later.

A connection plate 2 is fixed to an edge of the general part 15 of the slide plate 1B. The connection plate 2 extends along left and right edges of the slide plate 1B (FIG. 1) and as shown in FIG. 2, has a horizontal central part 21 and side parts 22, 23 curved upward and downward from the horizontal central part 21 and extending horizontally in a constant width. The connection plate 2 is caulked to the slide plate 1B at the side part 23 thereof. A hold-down plate 3 is caulked to the side part 22 of the connection plate 2. The hold-down plate 3 extends along the connection plate 2 (FIG. 1) and has a side part 31 located at a position upward from a curved portion disposed at its center and extending horizontally in a constant width and a side part 32 located at a position downward from the curved portion and extending horizontally in a constant width. The hold-down plate 3 and the connection plate 2, more specifically, the side part 31 of the hold-down plate 3 and the central part 21 of the connection plate 2 constitute a rail member L2, which is a first-type rail member and a fixed-side rail member, forming a U-shaped space S1 open toward the inner side of the slide device SE and extending in the longitudinal direction of the rail. The slide plate 1B and the connection plate 2, more specifically, the side part 13 of the slide plate 1B and the central part 21 of the connection plate 2 constitute a rail member L3, which is a first-type rail member and a movable-side rail member, forming a U-shaped space open toward the outer side of the slide device SE and extending in the longitudinal direction of the rail. These rail members L2, L3 are located at positions at which the rail members L2 and L3 overlap each other in the vertical direction.

The rail member L1 which is the side part 12 of the slide plate 1A is located in the U-shaped space of the rail member L2. A ball 81 serving as a resistance-reducing member is interposed between an upper surface of the rail member L1 and a lower surface of the side part 31 of the hold-down plate 3 opposed to the upper surface of the rail member L1. A ball 82 serving as a resistance-reducing member is interposed between a lower surface of the rail member L1 and an upper surface of the central part 21 of the connection plate 2 opposed to the lower surface of the rail member L1. The rail member L1, namely, the slide plate 1A is slidably movable relative to the rail member L2. That is, guide grooves 33, 34 parallel with one another longitudinally and guide grooves 16, 17 parallel with one another longitudinally and concave in the shape of a circular arc are formed on the lower surface of the side part 31 of the hold-down plate 3 and the lower surface of the rail member L1 respectively. The balls 81 and 82 are positioned in the guide grooves 33, 34 and the guide grooves 16, 17 respectively. The interval between the adjacent guide grooves 33 and 34 extending parallel with one another and the interval between the adjacent guide grooves 16 and 17 extending parallel with one another are so set that the balls 81, 82 disposed in these guide grooves overlap partly in the widthwise direction of the rails. That is, the interval between the centers of the guide grooves 33 and 34 in the widthwise direction thereof is set shorter than the total of the radii of the balls 81 disposed in the guide grooves 33, 34, and the interval between the centers of the guide grooves 16 and 17 in the widthwise direction thereof is shorter than the total of the radii of the balls 82 disposed in the guide grooves 16, 17.

Figure 4:
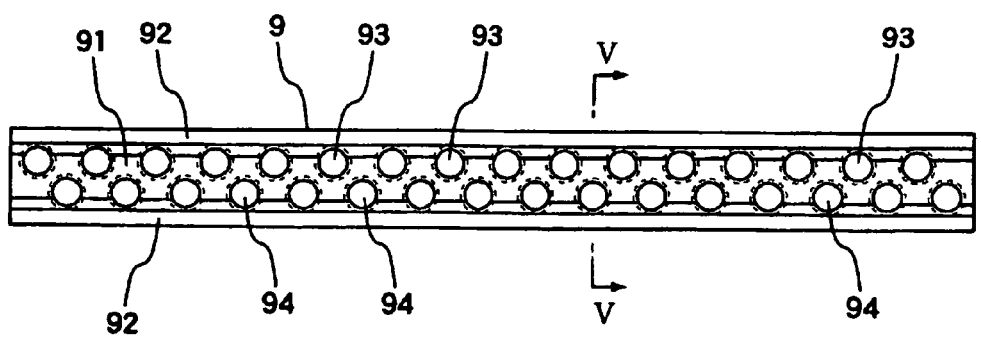
FIG. 4 is a plan view of an entire ball guide, showing an embodiment of the present invention.

The balls 81 and 82 are rotatably held by a ball guide 9. The ball guide 9 is a long plate, formed by molding a resinous material, having a constant width. A central part 91 (FIGS. 4 and 5) in the widthwise direction of the ball guide 9 is formed thick and both side parts 92 thereof are formed thin. A large number of ball-holding openings 93, 94 is formed longitudinally in two rows in the central part 91 of a surface of the ball guide 9. The positions of the ball-holding openings 93 formed in one row and those of the ball-holding openings 94 formed in the other row are shifted from each other in the longitudinal direction of the ball guide 9. More specifically, the ball-holding opening 93 of the one row is interposed between the ball-holding openings 94 positioned forward and rearward from the ball-holding opening 93 in the longitudinal direction of the ball guide 9. Further the ball-holding openings 93 and 94 overlap each other in the longitudinal direction of the ball guide 9. The ball-holding openings 93 formed in one row and the ball-holding openings 94 formed in the other row are so formed that the ball-holding openings 93 and the ball-holding openings 94 also overlap each other in the widthwise direction of the ball guide 9 in correspondence to the positions of the guide grooves 33 and 34.

Figure 5:
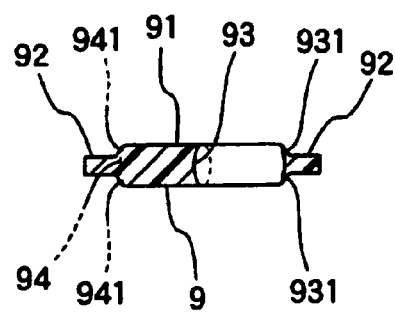
FIG. 5 is a sectional view taken along a line V-V of FIG. 4.

As shown in FIG. 5, the inner circumference of each of the ball-holding openings 93, 94 is so formed that the inner diameter of each of the ball-holding openings 93, 94 is a little larger than the outer diameter of the balls 81, 82 and decreases toward the aperture of the ball-holding openings 93, 94 to make the diameter of the aperture smaller than the outer diameter of the balls 81, 82. When the balls 81, 82 are inserted into the ball-holding openings 93, 94 by elastically expanding the aperture of one of the ball-holding openings 93, 94, the aperture returns to the original shape and prevents the balls 81, 82 from escaping from the ball holding openings 93, 94. In this state, as shown in FIG. 2, the balls 81, 82 are rotatably held in the ball holding openings 93, 94 with a lower portion of the balls 81, 82 exposed from the apertures.

In FIG. 2, inside the U-shaped space S2 of the rail member L3, a rail member L4 which is a second-type rail member and a fixed-side rail member is disposed. The rail member L4 is a side part 41 of a guide plate 4 extending along both sides of the slide plate 1B (FIG. 1). The guide plate 4 has a side part 42 located at a position upward from a curved portion disposed at its center and extending horizontally in a constant width and a side part 41 located at a position downward from the curved portion and extending horizontally in a constant width. The guide plate 4 and a reinforcing plate 5 disposed along the lower surface of the side part 42, curved, and extended to the lower surface of the side part 41 are fixed in an inclined posture by a bolt 61 penetrating through the side part 42 to a bracket 62 which is a base member provided on a rotary disk disposed on a slide mechanism (not shown) disposed in the longitudinal direction of the vehicle.

Figure 8:
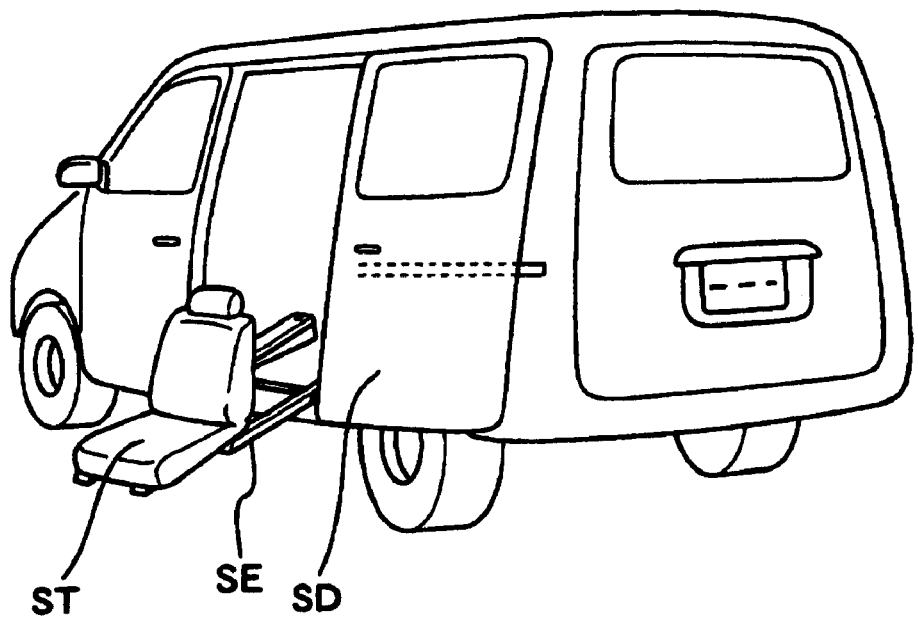
FIG. 8 is a rear perspective view showing a van-type vehicle having a conventional slide device.
Figure 9:
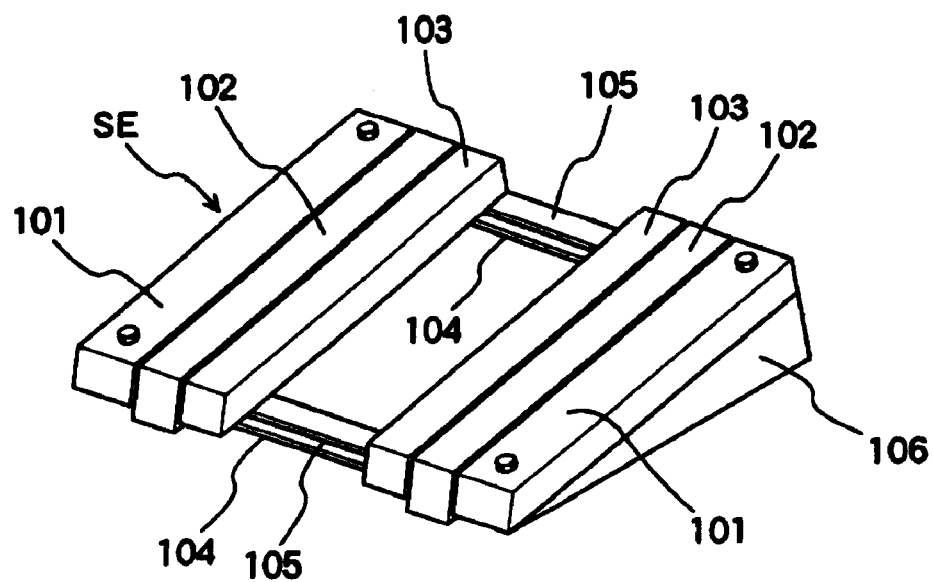
FIG. 9 is a perspective view showing a conventional slide device in an accommodated state.
Figure 10:
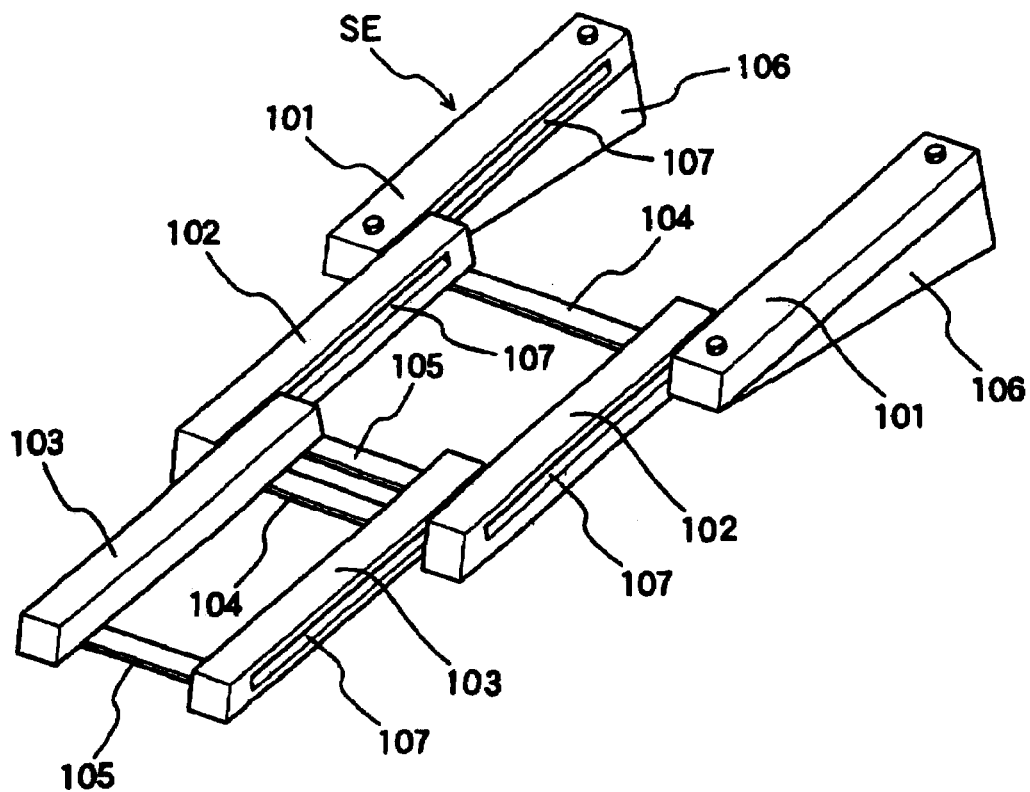
FIG. 10 is an entire perspective view showing a conventional slide device in an advanced state.
Figure 11:
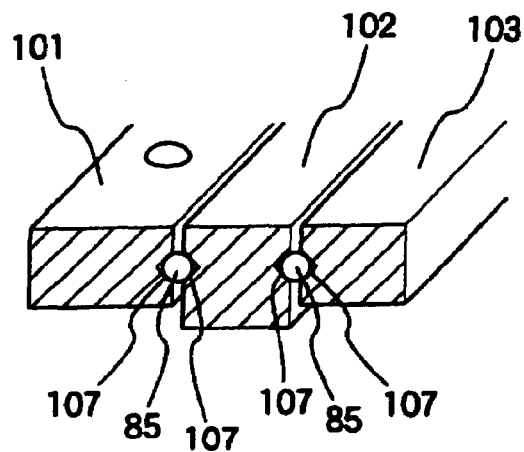
FIG. 11 is a perspective view of a conventional slide device in which main parts are cut away.

A ball 84 is interposed between an upper surface of the rail member L4 and a lower surface of the central part 21 of the connection plate 2 opposed to the upper surface of the rail member L4. A ball 82 is interposed between a lower surface of the rail member L4 and an upper surface of the side part 13 of the slide plate 1B opposed to the upper surface of the side part 13. The rail member L3, namely, the slide plate 1B is slidably movable relative to the rail member L4. That is, guide grooves 18, 19; 43, 44; and 71, 72 parallel with one another longitudinally and concave in the shape of a circular arc are formed on the lower surface of the central part 21 of the connection plate 2, the upper surface of the rail member L4, and the upper surface of the side part 13 of the slide plate 1B respectively. The balls 83, 84 are positioned in the guide grooves 18 through 72. The interval between the adjacent guide grooves 18 and 19; 43 and 44; and 71 and 72 extending parallel with each other respectively is so set that the balls 83, 84 disposed in these guide grooves overlap partly in the widthwise direction of the rails. That is, the interval between the centers of the guide grooves 18 and 19; 43 and 44; and 71 and 72 in the widthwise direction thereof is set shorter than the total of the radii of the balls 83, 84 disposed in the guide grooves 18 through 72. The balls 83, 84 are rotatably held by ball guide 9 having the same construction as that of the ball guide described above. The seat ST (FIG. 8) is placed on the slide plate 1A.

Figure 3:
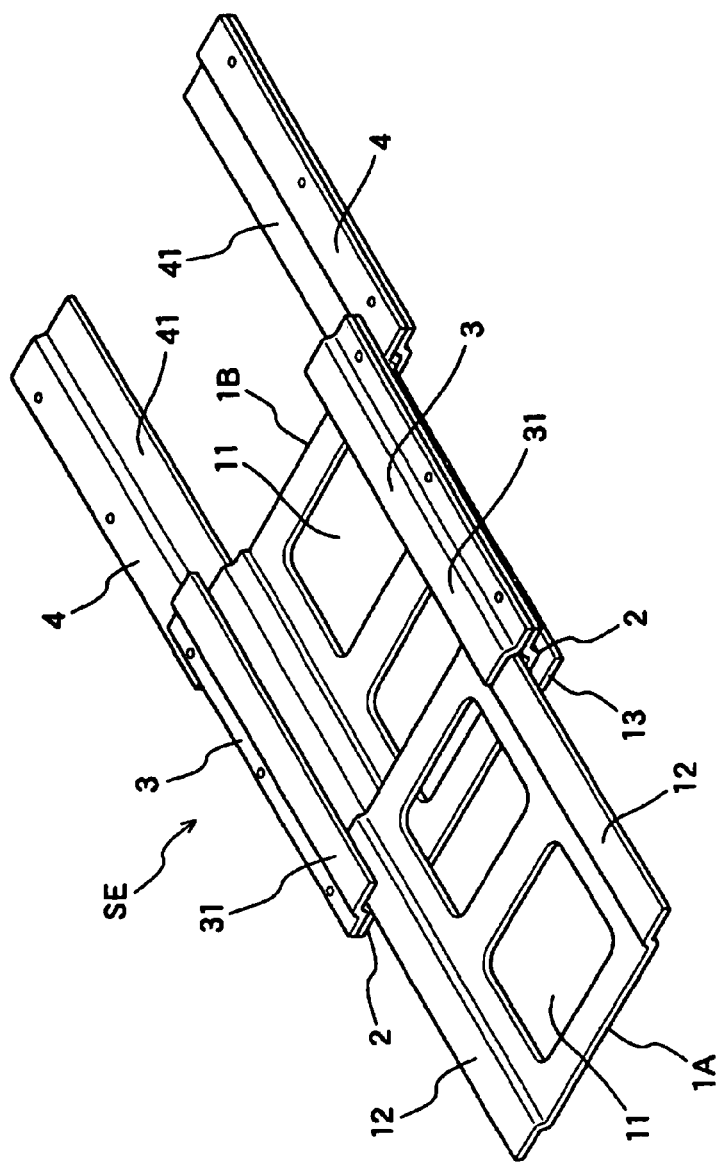
FIG. 3 is a perspective view of an entire slide device in an advanced state, showing an embodiment of the present invention.

When the physically handicapped person gets on and off the vehicle, the entire slide device SE is turned outward from the vehicle by means of the rotary disk. The slide plates 1B and 1A are slid in an advance direction with the slide plate 1B disposed forward from the slide plate 1A by a ball thread driving mechanism as shown in FIG. 3. Then the seat ST on the slide plate 1A is located at a location in the vicinity of a road surface.

In the above-described embodiment, the lower-side side wall and the upper-side side wall of each rail member are formed by molding a material by using the connection plate common to both the lower-side side wall and the upper-side side wall. But they may be formed by molding separate materials. The rail member is formed by molding a material in integration with the side part of the slide plate, and the lower-side side wall of the rail member is constructed of the side part of the slide plate. However, they may be formed by molding separate materials. In the above-described embodiment, the fixed-side rail member is constructed of the first-type rail member, and the movable-side rail member is constructed of the second-type rail member. However, the fixed-side rail member may be constructed of the second-type rail member, and the movable-side rail member may be constructed of the first-type rail member.

SECOND EMBODIMENT

Figure 6:
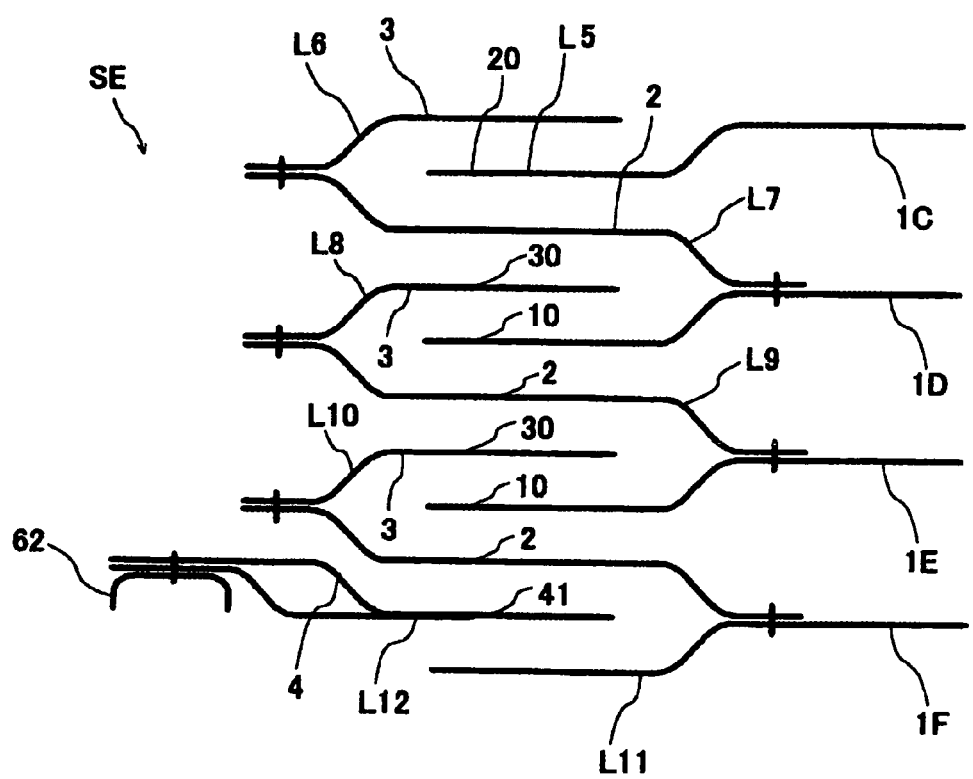
FIG. 6 is a schematic sectional view of an entire slide device, showing another embodiment of the present invention.

In the first embodiment, two slide plates, namely, the upper and lower slide plates are provided. But three or more side plates can be provided. FIG. 6 shows a schematic construction of a slide device having four slide plates. In FIG. 6, illustration of balls is omitted. In FIG. 6, four slide plates 1C through 1F are arranged vertically in an approximately horizontal posture. With the connection plate 2, the hold-down plate 3, and side parts of the slide plates 1C through 1F, rail members L6 through L11 forming U-shaped spaces open toward the inner and outer sides of the slide device SE are formed. These members are so disposed that they overlap each other in the vertical direction. In the rail members L7 through L10, an upper side 30 and a lower side 10 of one rail member penetrate into the U-shaped space of the other rail member. The upper sides 30 and the lower sides 10 constitute second-type rail members. The rail members L8, L10, provided on the slide plates 1E, 1F respectively, serving as a fixed-side rail member support the lower side 10 of the rail members L7, L9, provided on the slide plates 1D, 1E respectively as a movable-side rail member which is slidably movable. The rail member L5, which is a side part 20 of the uppermost slide plate 1C, serving as a second-type rail member and the movable-side rail member penetrates into the U-shaped space of the rail member L6, serving as the first-type rail member and the fixed-side rail member, provided on the slide plate 1D and is slidably supported by the rail member L6. A rail member L12, which is a side part 41 of the guide plate 4, serving as the second-type rail member and the fixed-side rail member penetrates into the U-shaped space of the rail member L11, serving as the first-type rail member and the fixed-side rail member, provided on the slide plate 1F positioned lowermost and is slidably supported by the rail member L11.

THIRD EMBODIMENT

Figure 7:
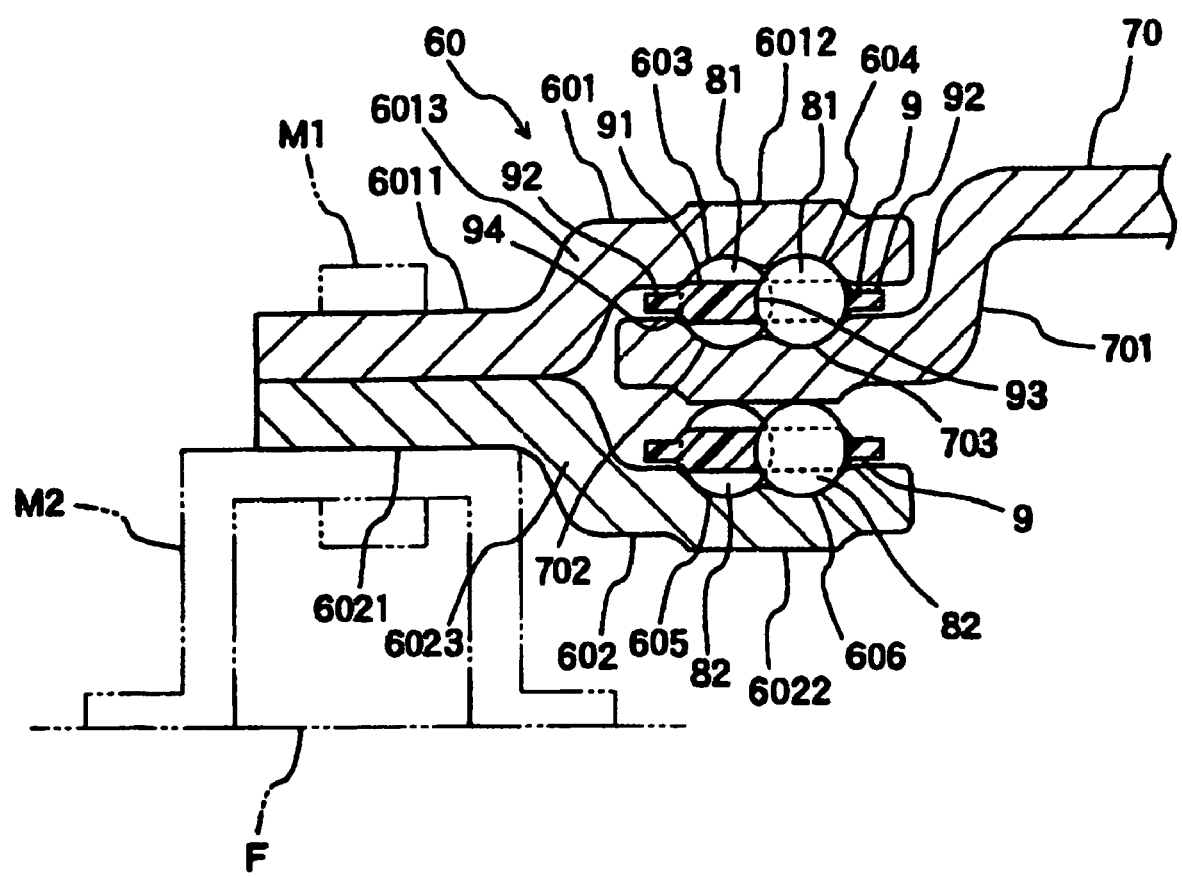
FIG. 7 is a sectional view of main parts of a slide device, showing still another embodiment of the present invention.

FIG. 7 shows a sectional view of main parts of a slide device. In FIG. 7, a fixed-side rail member (only one fixed-side rail member is shown) 60 of the slide device is constructed by connecting an upper rail 601 and a lower rail 602 to each other. That is, a long plate is formed by press molding to form the upper rail 601 and the lower rail 602. Half parts 6012 and 6022 extending approximately horizontally are bent vertically upward and downward from half parts 6011 and 6021 respectively at approximately the center of the upper rail 601 and the lower rail 602 in the widthwise direction of the rail. Thus the upper rail 601 and the lower rail 602 have the same configuration in section. The half parts 6011 and 6021 are butted against each other with the half parts 6011 and 6021 located symmetrically and vertically. The half parts 6011 and 6021 are fixedly connected to a bracket M2 on a floor F with a bolt M1 penetrating through the half parts 6011 and 6021 vertically. On an opposed surface of the half part 6012 of the upper rail 601 and an opposed surface of the lower rail 602 vertically opposed to the upper rail 601 at a certain interval, a pair of guide grooves 603, 604 and a pair of grooves 605, 606 concave in the shape of a circular arc are formed respectively. A pair of the guide grooves 603, 604 and a pair of the grooves 605, 606 extend parallel with each other respectively in the longitudinal direction of the rails.

The half parts 6012, 6022 located vertically and bent parts 6013, 6023 located vertically form a U-shaped space open sideways. A movable-side rail 701 is positioned in the U-shaped space. In this embodiment, the movable-side rail 701 is formed on a side edge of the slide plate 70 as a part thereof. That is, the slide plate 70 is bent downward at its both side edges (only one side is shown in FIG. 7) by press molding to form the side edges as the movable-side rail 701. A pair of guide grooves 702, 703 adjacent to each other, extending parallel with each other in the longitudinal direction of the rail, and concave in the shape of a circular arc are formed on the upper surface of the movable-side rail 701 at positions thereof opposed to the guide grooves 603, 604 of the upper rail 60. The balls 81 are interposed between the guide grooves 702, 703 formed on the upper surface of the movable-side rail 701 and the guide grooves 603, 604 of the upper rail 601. The balls 82 are interposed between the lower surface of the movable-side rail 701 and the guide grooves 605, 606 of the lower rail 602. The movable-side rail 701 is vertically sandwiched between the upper rail 601 and the lower rail 602 through the balls 81, 82 and is slidable. The interval between the adjacent guide grooves 603 and 604; 605 and 606; and 702 and 703 respectively is so set that the balls 81, 82 disposed in these guide grooves overlap in the widthwise direction of the rails. That is, the interval between the centers of the guide grooves 603 and 604; 605 and 606; and 702 and 703 in the widthwise direction thereof is set shorter than the total of the radii of the balls 81, 82 disposed in the guide grooves 603, 604, 605, 606, 702, and 703. The movable-side rail formed at the other side edge of the slide plate 70 has a construction similar to the above-described one and is slidably sandwiched between the upper and lower rails of the fixed-side rail through the balls. A rotary disk constructed of an inner ring and an outer ring is provided on the slide plate 70 at a position thereof situated between the widthwise center thereof and one side edge. Teeth formed on the entire periphery of the outer ring serving as a movable ring is in engagement with teeth of a rack formed on the fixed-side rail 60. A plate-shaped seat-installing bracket is placed on the outer ring, and a seat is provided on the bracket. The balls 81, 82 disposed on and under the movable-side rail 701 are rotatably held by the ball guide 9 similar to that described in the first embodiment. The ball guide 9 is a long plate, formed by molding a resinous material, having a constant width. A central part 91 in the widthwise direction of the ball guide 9 is formed thick and both side parts 92 thereof are formed thin. A large number of ball-holding openings 93, 94 is formed longitudinally in two rows in the central part 91 of a surface of the ball guide 9. The positions of the ball-holding openings 93 formed in one row and those of the ball-holding openings 94 formed in the other row are shifted from each other in the longitudinal direction of the ball guide 9. More specifically, the ball-holding opening 93 of the one row is interposed between the ball-holding openings 94 positioned forward and rearward from the ball-holding opening 93 in the longitudinal direction of the ball guide 9. Further the ball-holding openings 93 and 94 overlap each other in the longitudinal direction of the ball guide 9. The ball-holding openings 93 formed in the one row and the ball-holding openings 94 formed in the other row are so formed that the ball-holding openings 93 and the ball-holding openings 94 also overlap each other in the widthwise direction of the ball guide 9 in correspondence to the positions of the guide grooves 603, 604, 605, 606, 702, and 703.

The inner circumference of each of the ball-holding openings 93, 94 is so formed that the inner diameter of each of the ball-holding openings 93, 94 is a little larger than the outer diameter of the balls 81, 82 and decreases toward the aperture of the ball-holding openings 93, 94 to make the diameter of the aperture smaller than the outer diameter of the balls 81, 82. When the balls 81, 82 are inserted into the ball-holding openings 93, 94 by elastically expanding the aperture of one of the ball-holding openings 93, 94, the aperture returns to the original shape and prevents the balls 81, 82 from escaping from the ball holding openings 93, 94. In this state, as shown in FIG. 7, the balls 81, 82 are rotatably held in the ball holding openings 93, 94 with a lower portion of the balls 81, 82 exposed from the apertures.

In the slide device of this embodiment, it is possible to make the number of balls two times that of the conventional slide device, although the length of the ball guide 9 is equal to that of the conventional slide device. Thus when a high load of vertically shifting the fixed-side rail 60 and the movable-side rail 701 relative to each other is applied, the load is dispersed to a large number of the balls 81, 82 and hence the surface pressure of each of the balls 81, 82 is reduced to about ½ of that applied to the surface pressure of the ball in the conventional slide device. Therefore it is unnecessary to quench the guide grooves 603, 604, 605, 606, 702, and 703 and it is possible to save labor required in manufacturing the slide device and reduce the manufacturing cost. In this embodiment, the movable-side rail 701 is vertically sandwiched between the upper rail 601 and the lower rail 602 disposed through the balls 81, 82. Therefore the slide device has a sufficient degree of durability when a load of vertically shifting the rails 601, 602 is applied. Because the upper rail 601 and the lower rail 602 constituting the fixed-side rail 60 and the movable-side rail 701 can be all manufactured by press molding, it is possible to reduce the manufacturing cost. In addition, the adjacent guide grooves 603, 604, 605, 606, 702, and 703 are spaced from each other in such a way that the balls 81, 82 disposed in these grooves overlap each other in the longitudinal direction of the rails. Therefore it is possible to minimize the guide groove formation range in the widthwise direction (right-to-left direction in FIG. 7) on the lower surface of the upper rail 60, the opposed upper surface of the lower rail 602, and the upper and lower surfaces of the movable-side rail 701. Thereby it is possible to make the movable-side rails compact.

In the above-described embodiment, the guide grooves formed on the lower and upper rails and on the movable-side rail are formed in two parallel rows. But three or more rows may be formed. In the above-described embodiment, the guide groove is formed on only the upper surface of the movable-side rail. But it is possible to form the guide groove on the lower surface of the movable-side rail in confrontation with the guide groove of the lower rail. In the above-described embodiment, the movable-side rail is formed at a portion of the slide plate. But this may be molded separately. In this case, by forming the movable-side rail, the upper rail, and the lower rail in the same shape, it is possible to reduce the manufacturing cost. Further instead of adopting the construction of sandwiching the movable-side rail between the upper and lower rails through the balls, the present invention is applicable to a construction of interposing the balls between the side surface of the fixing-side rail and the opposed side surface of the movable-side rail. In addition, the slide device of the present invention is applicable to other uses than the slide seat mechanism. The ball guide does not necessarily have to have the construction described in the above embodiment. But it is possible to use the ball guide capable of holding the balls in the disposition state described in the above embodiment. But it is essential to dispose the balls in a such a manner that balls positioned forward and rearward overlap each other in the widthwise direction normal to the guide groove formation direction.

INDUSTRIAL APPLCABILITY

As described above, the slide device of the present invention can be easily manufactured and assembled and is applicable to the slide seat which is used when the physically handicapped person gets and on the vehicle.

What is claimed is:
1. A slide device comprising:
a first-type rail member forming a space open sideways and extending in a longitudinal direction of said first-type rail member;
a second-type rail member positioned in said space;
a resistance-reducing member interposed between an upper surface of said second- type rail member and an opposed upper-side surface of said first-type rail member and between a lower surface of said second-type rail member and an opposed lower-side surface of said first-type rail member to allow said first-type rail member and said second-type rail member to move relative to each other in said longitudinal direction of said first-type rail member and said second-type rail member; and
wherein one of said first-type rail member and said second-type rail member movable relative to each other is constructed as a movable-side rail member;
wherein the other of said first-type rail member and said second-type rail member is constructed as a fixed-side rail member supporting said movable-side rail member;

wherein said movable-side rail member is provided on both side parts of a slide plate and supported by said fixed-side rail member provided on a base member;

wherein said first-type rail member is constructed by molding a plate into an approximately U-shaped configuration in section; and wherein said second-type rail member is constructed of a flat plate inserted into a space of said first-type rail member.

2. A slide device according to claim 1, wherein a plurality of said slide plates are positioned on said base member with said plurality of said slide plates parallel with one another; and said movable-side rail member provided on one of said plurality of said slide plates is supported by said fixed-side rail member provided on another slide plate adjacent to said one of said plurality of said slide plates or said base member.

3. A slide device according to claim 1, wherein said movable-side rail member and said fixed-side rail member disposed in a vertical direction are constructed of said sectionally approximately U-shaped first-type rail member forming a space open in one direction and said sectionally approximately U-shaped first-type rail member forming a space open in the other direction respectively; and one of side walls of said both first-type rail members vertically disposed is formed by molding a common member.

4. A slide device according to claim 1, wherein a plurality of guide grooves extending parallel with one another in a longitudinal direction of said first-type rail member and said second-type rail member is formed on at least one of said upper-side surface and a lower-side surface of said first-type rail member, said upper-side surface and lower-side surface of said second-type rail member; a plurality of balls serving as a resistance-reducing member is rollably disposed along said guide grooves; and a plurality of said guide grooves are spaced from each other in such a way that said balls disposed in said guide grooves adjacent to each other overlap each other in said longitudinal direction of said first-type rail member and said second-type rail member.

5. A slide device in which upper and lower slide plates are arranged in an approximately horizontal posture in a vertical direction and parallel with each other, comprising:

a first rail section forming a space which has an upper-side portion and a lower-side portion and is open toward one of left and right directions of said upper and lower slide plates is provided at left and right side parts of said lower slide plate;

a second rail section forming a space which has an upper-side portion and a lower-side portion and is open toward the other of said left and right directions of said upper and lower slide plates is provided over said first rail section;

a third rail section slidably fining on said second rail section is provided at both side parts of said upper slide plate;

a fourth rail section slidably fining on said first rail section is provided on a base member; and wherein a lower-side part of said second rail section is constructed of an upper-side part of a first rail part of each of said upper and lower slide plates.

6. A slide device in which a plurality of slide plates are vertically arranged on a base member in an approximately horizontal posture and parallel with each other, comprising:

a first rail section forming a space which has an upper-side portion and a lower-side portion and is open toward one of left and right directions of said slide plates is provided at left and right side parts of said slide plates except an uppermost slide plate;

a second rail section forming a space which has an upper-side portion and a lower-side portion and is open toward the other of said left and right directions of said slide plates is provided over said first rail section;

a lower-side part of said first rail section of one of said slide plates is slidably fitted on said second rail section of another slide plate downwardly adjacent to said one of said slide plates;

an upper-side part of said second rail section of one of said slide plates is slidably fitted on said first rail section of another slide plate upwardly adjacent to said one of said slide plates;

a third rail section slidably fitting on said second rail section of one of said slide plates downwardly adjacent to another slide plate disposed uppermost is provided on both left and right side parts of said slide plate disposed uppermost; and a fourth rail section slidably fitting on said first rail section of a slide plate disposed lowermost is provided on said base member.

7. A slide device according to claim 6, wherein a guide groove extending in a slide direction of at least one of said slide plates is formed on at least one of vertically opposed surfaces of said first, second, third, and fourth rail sections; and a plurality of balls which rollably contact said opposed surfaces is disposed on said guide groove.

8. A slide device according to claim 7, wherein said guide grooves of said first, second, third, and fourth rail sections are located at positions vertically overlapping each other.

9. A slide device according to claim 7, wherein a plurality of said guide groove are formed on one surface; and a plurality of said guide grooves are spaced from each other in such a way that said balls disposed in said grooves adjacent to each other overlap each other in said slide direction of at least one of said slide plates.

10. A slide device in which upper and lower slide plates having substantially horizontal posture and movable separately are parallel at upper position and lower position with each other, comprising:

a first rail section forming a space which has an upper-side portion and a lower-side portion and is open toward one of left and right directions of said upper and lower slide plates is provided at left and right side parts of said lower slide plate;

a second rail section forming a space which has an upper-side portion and a lower-side portion and is open toward the other of said left and right directions of said upper and lower slide plates is provided over said first rail section;

a third rail section slidably fitting on said second rail section is provided at both side parts of said upper slide plate;

a fourth rail section slidably fitting on said first rail section is provided on a base member; and wherein said first rail section and said second rail section are attached by a connection plate; and wherein said first rail section, said second rail section and said connection plate are immovable with respect to one another.

* * * * *